Figure 1:
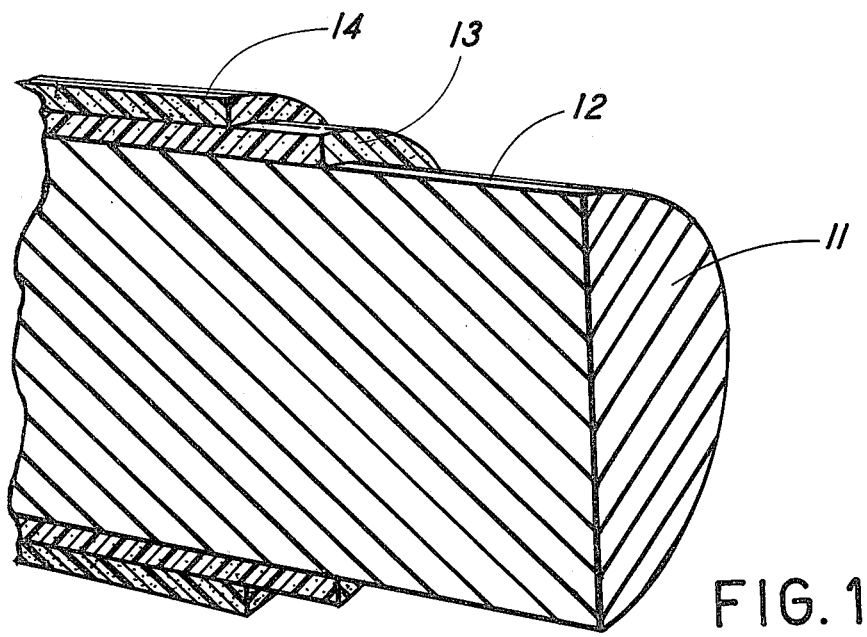

United States Patent [19]

McCarthy

[11] 4,330,956
[45] May 25, 1982

[54] DUAL COATED WIRE TROLLING LINE

[76] Inventor: John T. McCarthy, 20 Main St., Newtown, Conn. 06470

[21] Appl. No.: 87,055

[22] Filed: Oct. 22, 1979

[51] Int. Cl.³ ............................................ A01K 91/00
[52] U.S. Cl. ...................................... 43/4; 43/44.98; 428/383
[58] Field of Search .................. 43/44.98, 4, 4.5, 27.4; 428/375, 379, 380, 383; 114/252, 253

[56] References Cited

U.S. PATENT DOCUMENTS

| | | | |
|---|---|---|---|
| 3,406,045 | 10/1968 | Sattler | 428/383 |
| 3,425,866 | 2/1969 | Meyer | 428/383 |
| 3,451,305 | 6/1969 | Christensen | 43/44.98 X |
| 3,482,034 | 12/1969 | Rhoades et al. | 114/253 |
| 3,868,785 | 3/1975 | Foote | 43/44.98 |
| 4,050,180 | 9/1977 | King | 43/4 |
| 4,107,370 | 8/1978 | Ingraham | 428/383 |

FOREIGN PATENT DOCUMENTS 1550216  8/1979  United Kingdom ............... 43/44.98

Primary Examiner—Stephen G. Kunin
Assistant Examiner—K. Bradford Adolphson
Attorney, Agent, or Firm—Robert H. Ware; Melvin I Stoltz; Alfred A. Fressola

[57] ABSTRACT

A wire fishing line for deep water trolling comprises a length of stainless steel or Monel wire, with a first tough, substantially non-porous Formvar polyvinyl formal polymer coating layer adherently bonded to the peripheral surface of the wire, and a second, low-friction Nylon linear polyamide coating layer bonded to the peripheral surface of the first coating layer, whereby a polymer-coated wire is achieved which has high lubricity, is capable of smooth closely packed coiling in even helical layers on the spool of a fishing reel, and which is substantially impervious to salt water and fresh water immersion and capable of repeated immersions without significant loss of tensile strength.

9 Claims, 3 Drawing Figures

DUAL COATED WIRE TROLLING LINE

This invention relates to wire trolling line for deep water fishing, and particularly to wire line having protective synthetic resin coatings extending the useful life of the wire line and providing colors less noticeable to game fish than conventional wire line, while providing unexpectedly improved recoiling of the line on the spool of the fishing reel, minimizing snarling or tangling.

BACKGROUND ART

Cotton, silk and more recently braided and monofilament nylon have long been popular materials for fishing line. In recent years, wire line has gained increasing popularity for deep water trolling, providing the weight needed for carrying lures or bait down to deep fishing depths.

Wire line has increased fishermen's interest in deep trolling, and the most popular lines are nylon-covered lead-core line, braided Monel and solid, soft-drawn Monel, according to Frank T. Moss, Successful Striped Bass Fishing, p. 59 (1974 ed. Int'l Marine Pub. Co.).

Wire line provides the advantage of extra weight, sinking the line without heavy sinkers, and it offers the strength and toughness needed to fight and land big game fish. However, the stiffness of wire line makes it unsuitable for spinning reels, requiring a conventional revolving spool reel, a bait casting or game fish reel, to retrieve and handle the line. In addition, the wire line must be maintained under tension at all times to avoid snarling and tangling on the reel, requiring continuous "thumbing" pressure of the angler's thumb on the line entering the reel.

The hard unyielding metal surface of bare wire line running past the user's thumb produces friction heat, and burns may result unless a glove is worn. The bare wire's metal surface also abrades and destroys the ring-shaped or roller guides of fishing rods, whether they are surfaced with stainless steel, Carboloy or ceramic surfaces.

Another disadvantage of wire trolling line is the bright metal surface, exhibiting flashing, silver-colored reflections and distracting or frightening the fish. Many fishermen believe that trolling line colored blue or aquamarine will blend unnoticeably with the water at shoal depths, and black line is recommended for deeper trolling, where sunlight hardly penetrates.

The advent of synthetic resins and polymers has affected the fishing tackle market not only through the introduction of braided and monofilament nylon and dacron line, but also nylon-covered lead-core line and polymer covered wire leaders. A celluloid-sheathed twisted wire "snell" or leader is illustrated in Willoughby's U.S. Pat. No. 396,130, issued in 1889, and nylon-sheathed twisted and braided leaders of multi-strand stainless steel wire are illustrated in Christensen's U.S. Pat. No. 3,451,305, issued in 1969.

While a nylon coating on the surface of a wire line theoretically should improve line-handling characteristics while protecting the wire from corrosion in sea water, I have observed that such a nylon coating on wire immersed as little as 22 hours shows notable "crazing" or easily strips off when abraded or scraped, apparently lacking bonded adhesion to the metal surface. Nylon is known to absorb from three to ten percent of its weight of water (Moss, Op. cit., p. 27) apparently in minute, microscopic pores or interstices. Salt water penetrating through such microporosity and reaching the underlying surface of the metal wire can be expected to promote corrosion of the metal, and the resulting increased volume of metal oxide may actually stretch and tear the nylon coating away from the metal surface, rupturing any bond achieved between metal and nylon.

Accordingly a principal object of the present invention is to provide long lasting wire fishing line having a permanent tough protective corrosion-proof coating.

Another object of the invention is to provide such wire fishing line having smooth "level-winding" coiling properties, avoiding snarling and tangling when being re-wound on the spool of the reel.

A further object of the invention is to provide such wire fishing line having a smooth resilient surface of high lubricity and low coefficient of friction, reducing friction and heat on the angler's thumb and on fishing rod rollers and guides during use.

Other objects of the invention will in part be obvious and will in part appear hereinafter.

DISCLOSURE OF THE INVENTION

I have found that the prior art difficulties encountered with wire fishing lines are substantially completely obviated by employing a combined dual-layer coating on the wire, with this dual-layer coating comprising a tough bonding layer applied directly to the peripheral surface of the wire and a second low-friction, lubricating layer applied to the peripheral surface of the bonding layer. When a wire of this construction is employed as a fishing line, the fisherman is able to enjoy all of the desirable advantages of trolling with a wire fishing line, without experiencing any of the prior art difficulties. In addition, the dual layer coated fishing line wire of the present invention provides several unexpected advantages.

In the preferred embodiment, the bonding layer comprises a base coating of polyvinyl formal polymer sold under the Monsanto Company's trademark Formvar ®. This coating provides tenacious adherence to the wire surface while also minimizing porosity and subsequent stripping or scaling of the protective coating. The lubricating layer preferably comprises an overlying layer of low friction Nylon linear polyamide polymer, which provides striking lubricity, avoiding friction heat or injury to the angler's thumb and to his tackle, reel, guides and rollers.

In this combination, the Formvar ® base coating assures the solid integrity of the coated wire line, maintaining its effectiveness throughout a long useful life. In addition, both coating materials may be selected to provide black, blue, or other desired color shades for the resulting coated wire line, optimizing their usefulness in landing game fish.

Although wires having double-layer coatings presently exist for use as the windings of electric motors, these double-layer coating wires have never been used as a fishing line. The unique non-obvious inventive step achieved by employing this dual-layer coated wire as a wire fishing line is clearly and readily apparent from the facts that wire fishing lines have long been used, have traditionally been recognized for their strength and physical advantages, and until now have never been capable of eliminating the prior art problems discussed above.

With the present invention, these prior art difficulties are overcome, and a wire fishing line is achieved having inherent strength and sinking capability while also being flexible, for ease of recoiling on the spool or reel, without snarling and tangling. In addition, the double-layer coated wire of the present invention has a low coefficient of friction and inherent lubricity, thereby preventing thumb burns during release of the fishing line.

The invention accordingly comprises articles of manufacture possessing the features, properties, and the relations of elements which will be exemplified in the articles hereinafter described, as well as methods and techniques for making and using these articles, and the scope of the invention will be indicated in the claims.

For a fuller understanding of the nature and objects of the invention, reference should be had to the following detailed description taken in connection with the accompanying drawings.

THE DRAWINGS

Figure 2:
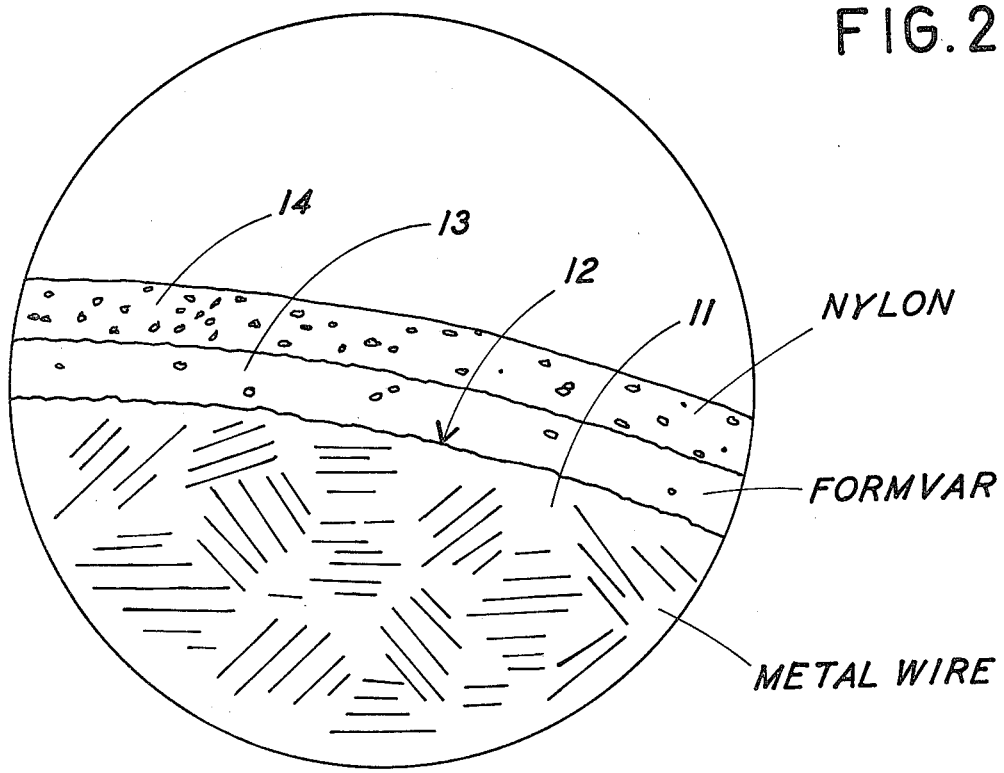
Figure 3:
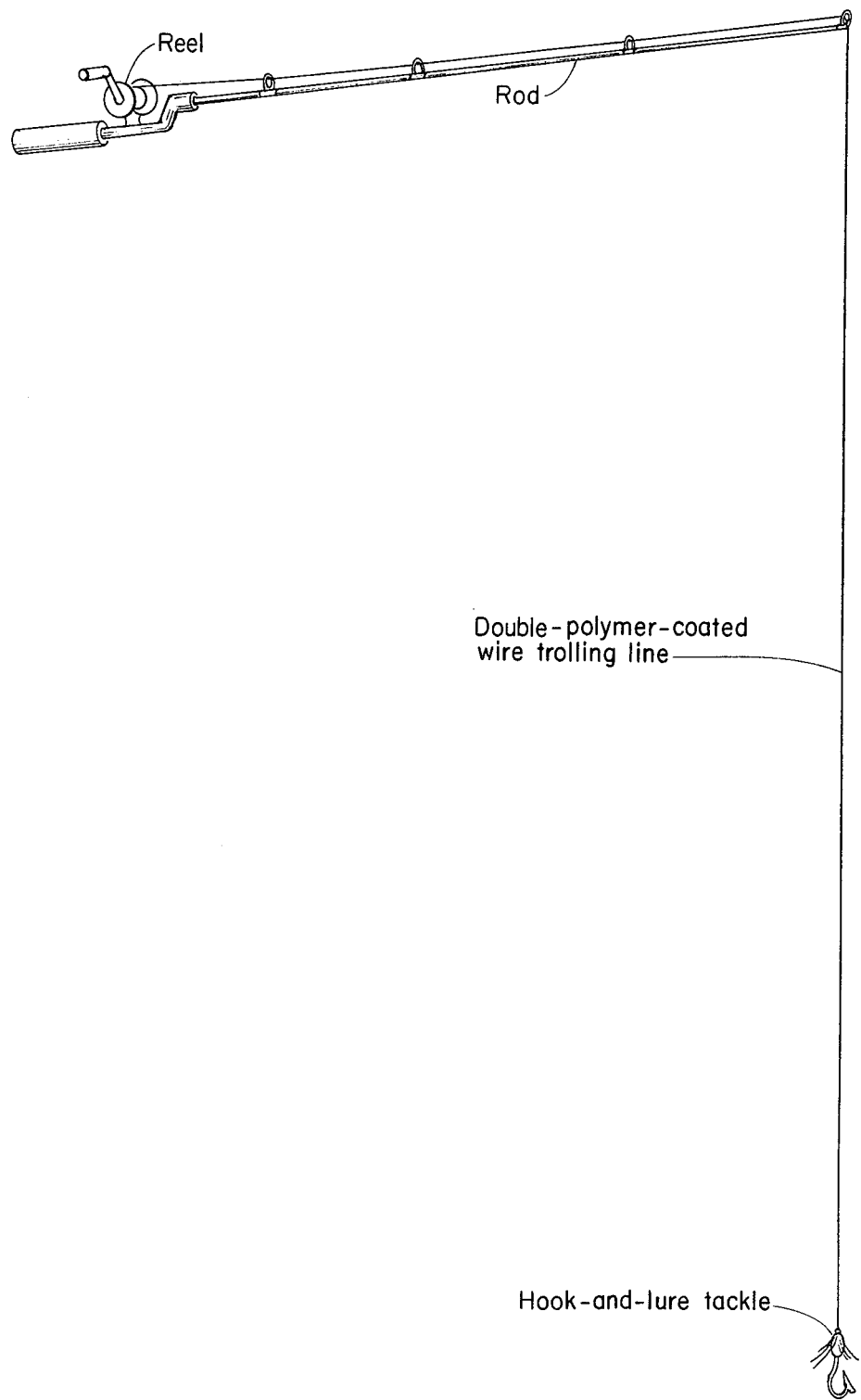

FIG. 1 is a greatly enlarged fragmentary perspective cross sectional elevation view of a wire trolling line of the invention, FIG. 2 is a further enlarged cross sectional view, after a 500×photomicrograph, showing a portion of the periphery of a wire trolling line of the invention with its coating layers bonded thereto, and FIG. 3 is a schematic diagram of the double polymer coated wire trolling line shown in the previous figures, connecting a trolling lure to a trolling rod and reel.

BEST MODE FOR CARRYING OUT THE INVENTION

Based upon the wire-insulating coating developments relating to the windings of electric motors, I have discovered that wire of nickel-copper alloys such as those sold under the trademark Monel, and also chromium stainless steel, both suitable for use as wire fishing line, exhibit greatly improved characteristics if they are provided with a dual coating indicated in FIG. 1 and composed of a tough bonding layer 13 applied directly on the peripheral surface 12 of the wire 11, surmounted by an overlying lubricating layer 14 of low-friction material.

The preferred bonding layer 13 found most effective is Monsanto "Formvar" polyvinyl formal polymer compounded by Schenectady Chemicals Inc. of Schenectady, New York in a solvent solution called "Schenectady 1169-H Formvar Wire Enamel" for application in vertical magnet wire coating machines using split or clip (doghouse) dies, or in horizontal machines using roller dies. As a thinning solvent, a mixture of 40% cresylic acid and 60% aromatic hydrocarbon, i.e. xylol or Exxon similar material sold under the trademark Solvesso 100 ® is recommended. This Formvar is customarily applied in two to four coating steps, each followed by a baking-curing step. The resulting coating 13 is so intimately bonded to the wire surface 12 that it can be removed only with extreme difficulty. An overlying layer 14 of Nylon is likewise firmly bonded to the Formvar, eliminating any peeling, sloughing, chipping or crazing of the Nylon.

Isomid, Isonel and Amide imide polymers are also believed to provide suitable bonding base coatings 13 as substitutes for Formvar.

The preferred low friction outer coating 14 for the wire trolling line of this invention is type 66 Nylon Linear polyamide, compounded in a solvent solution called "1146 Nylon Wire Enamel" by Schenectady Chemicals, Inc. of Schenectady, New York, and a thinning solvent can be used composed of 75% cresylic acid and 25% aromatic hydrocarbon solvent (i.e. Exxon Solvesso ®).

Polyurethane is believed to be a suitable substitute for the preferred low friction Nylon of outer coating 14.

As indicated in FIG. 2, the low friction Nylon outer coating 14 is believed to incorporate microscopic porosities, which may be interconnected, and may explain the absorption of salt water in the outer Nylon coating to the extent of 3% to 7% of the weight of the Nylon, reported by Moss, op. cit., page 27. After 22 hours of immersion in salt water, a preweighed sample length of coated wire weighing 0.50 pound dry was found to have increased its weight to 0.51 pound, an increase of 2% in the overall weight of the immersed coated wire. After three hours air drying at room temperature, the preweighed coated wire sample was found to have returned to its original weight of 0.50 pound.

The absorbed water is believed to have a cooling effect, enhancing the lubricity of the Nylon coating and eliminating the need for a glove on the angler's hand to avoid burns.

A major advantage of the combined Formvar-Nylon coating of this invention is the surprising ease of rewinding the coated wire on the spool of a fishing reel. The lay-up of such coated wire in smooth, even, adjacent turns, layer after layer, is much enhanced by the dual coating of the invention, and the risk of crazing or peeling of the Nylon coating is entirely prevented by the tough, strongly adherent Formvar base coating.

Typical coating thicknesses on stainless steel wire and Monel wire of various diameters are shown in Tables I and II.

TABLE I

Coating Buildup On Bare Wire: Stainless Steel Formvar/Nylon Overall

| Test # | Bare Wire Diam., In. | Coated Diam. Min. | Coated Diam. Max. | Total Coating Thickness | | | |
|---|---|---|---|---|---|---|---|
| | | | | Min. | % | Max. | % |
| 20 | .016 | .0166 | .0206 | 0.0003 | 1.88 | 0.0023 | 14.38 |
| 25 | .018 | .0186 | .0226 | 0.0003 | 1.67 | 0.0023 | 12.78 |
| 40 | .023 | .0234 | .0279 | 0.0002 | 0.87 | 0.0024 | 10.43 |
| 50 | .025 | .0261 | .0308 | 0.0006 | 2.40 | 0.0024 | 9.60 |
| 60 | .028 | .0293 | .0342 | 0.0007 | 2.50 | 0.0031 | 11.07 |
| 75 | .032 | .0329 | .0379 | 0.0004 | 1.25 | 0.0030 | 9.38 |
| 100 | .036 | .0367 | .0422 | 0.0004 | 1.11 | 0.0031 | 8.61 |

TABLE II

Coating Buildup On Bare Wire: Monel Wire, Type 400 & 401 Formvar/Nylon Overall

| Test # | Bare Wire Diam., In. | Coated Diam. Min. | Coated Diam. Max. | Total Coating Thickness | | | |
|---|---|---|---|---|---|---|---|
| | | | | Min. | % | Max. | % |
| 20 | .018 | .0186 | .0228 | 0.003 | 1.67 | 0.0024 | 13.33 |
| 25 | .020 | .0209 | .0252 | 0.004 | 0.0026 | 13.00 | |
| | | | | 2.00 | | | |
| 40 | .025 | .0261 | .0308 | 0.006 | 2.40 | 0.0029 | 11.60 |
| 50 | .028 | .0293 | .0342 | 0.006 | 2.14 | 0.0031 | 11.07 |
| 60 | .032 | .0329 | .0379 | 0.004 | 1.25 | 0.0030 | 9.38 |
| 75 | .035 | .0367 | .0422 | 0.008 | 2.29 | 0.0036 | 10.29 |
| 100 | .040 | .0412 | .0458 | 0.006 | 1.50 | 0.0029 | 7.25 |

Measurements of photomicrographs of the kind illustrated in FIG. 2 indicate that normal dual-coating thicknesses can be expected to range preferably from about 2.5% to about 5% of the bare wire diameter. The Formvar base layer and the low-friction Nylon outer coating are generally approximately equal in thickness.

The surprising and unexpected advantage of the dual coatings of this invention in maintaining the full tensile strength and avoiding degradation, corrosion or weakening of coated 40-pound test Monel wire after multiple immersions in salt water are confirmed by the laboratory test series summarized in Table III.

TABLE III

Reduction In Breaking Strength Of "Forty-Pound Test" Monel 401 Wire After Salt Water Immersion

| Reduction in Breaking Load and Tensile Stress | Sample No. | Testing Conditions | Wire Diam. | Coating | Breaking Load in Tension | Tensile Stress psi |
|---|---|---|---|---|---|---|
| 0 | 41A | Untested Control | 0.0246" | None | 37.0 lbs. | 77,894 |
| 0 | 41B | Untested Control | 0.0246" | None | 37.0 lbs. | 77,894 |
| 0 | 42A | Untested Control | 0.0246" | None | 37.1 lbs. | 78,105 |
| 0 | 42B | Untested Control | 0.0246" | None | 37.1 lbs. | 78,105 |
| 3.24% | 43 | Estimated 50 immersions during six months actual salt water fishing | initial 0.0246"; final, with corrosion: 0.0255" | None | 35.85 lbs. | 75,474 |
| 11.74% | 44 | 7 immersions in 6 days, salt water test tank | 0.0246" bare | None | 32.7 lbs. | 68,842 |
| 0 | 45 | 7 immersions in 6 days, salt water test tank | 0.0261" (with coating) | Nylon over Formvar | 37.1 lbs. | 78,105 |
| 2.14% | 51 | 19 immersions in 15 days, salt water test tank | 0.0247" | None | 36.3 lbs. | 76,421 |
| 0 | 52 | 19 immersions in 15 days, salt water test tank | 0.0264" (bare wire: 0.02465") | Nylon over Formvar | 37.0 lbs. | 77,894 |
| 8.23% | 53 | 19 immersions in 15 days, salt water test tank | 0.02635" (bare wire: 0.0246") | Nylon only | 34.0 lbs. | 71,579 |

Table III clearly shows, after only a few days of repeated immersions, that salt water reduced the tensile strength of uncoated bare wire by more than 11%, and nylon-coated wire up to 8%. It is noteworthy that Formvar/Nylon dual-coated wire of the present invention maintained the full original tensile strength of the uncoated wire, with no reduction whatever after nineteen days of salt water immersions.

An unexpected advantage of the dual coatings of this invention is the highly desirable choice of colors afforded. Many deep water anglers recommend blue line for shallow depth trolling and black line for deeper trolling, to minimize contrast with the water as it is dimly illuminated by sunlight from the surface. Such colors have been generally unavailable with conventional wire line, since its metallic lustre is difficult to camouflage.

The dual coatings of this invention may be formulated in various desired shades and colors. When these advantageous colors are combined with smooth, cool, frictionless operation and easy compact recoiling lay-up during re-winding retrieval on the reel spool, avoiding snarls and tangles, a commercially valuable wire trolling line is achieved.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In a fishing tackle assembly for deep water trolling incorporating a fishing rod, a spool fishing reel and hook-and-lure tackle, the improvement comprising a double-polymer-coated wire trolling line having one end secured to the hook-and-lure tackle and the other end coiled on the spool of the reel, the trolling line being formed of a unitary, single-strand wire line of an outside diameter between about 0.016 inches and about 0.036 inches, and having its entire peripheral surface covered by a first substantially non-porous polymer coating adherently bonded to the wire, with a second, low-friction polymer coating layer bonded to to the entire peripheral surface of the first coating layer, with the combined coatings having a total thickness between about 0.85% and about 15% of the overall outside diameter of the double-coated wire, whereby the reel and the hook-and-lure tackle are connected by the double-polymer-coated wire trolling line having high lubricity, which is capable of smooth closely packed coiling in even helical layers on the spool of the fishing reel, and which is substantially impervious to salt water and fresh water immersion and capable of repeated immersions without significant loss of tensile strength.

2. The fishing tackle assembly defined in claim 1 wherein the base layer coating material is polyvinyl formal polymer.

3. The fishing tackle assembly defined in claim 1 wherein the second low friction coating material is nylon linear polyamide.

4. The fishing tackle assembly defined in claim 1 wherein the total thickness of the coating material is at least 1.25% of the bare wire diameter.

5. The fishing tackle assembly defined in claim 1 wherein the total thickness of the coating material is 14.4% or less of the bare wire diameter.

6. The fishing tackle assembly defined in claim 1 wherein the total thickness of the coating materials is equal to from about 2.5% to about 5.0% of the bare wire diameter.

7. The fishing tackle assembly defined in claim 1 wherein the substantially non-porous polymer coating layer and the second low-friction coating layer are substantially equal in thickness.

8. The fishing tackle assembly defined in claim 1 wherein the wire line is formed of a Monel alloy of nickel and copper.

9. The fishing tackle assembly defined in claim 1 wherein the wire line is formed of a chromium stainless steel alloy.

* * * * *